United States Patent
Hirt et al.

(10) Patent No.: US 9,950,745 B2
(45) Date of Patent: Apr. 24, 2018

(54) COCKPIT CROSS BEAM WITH VARIABLE STEERING COLUMN ANGLE OF INCLINATION

(75) Inventors: Mark Hirt, Bochum (DE); Martin Hinz, Bergkamen (DE); Detlef Steinhöfer, Schloss Holte-Stuckenbrock (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 1253 days.

(21) Appl. No.: 12/847,288

(22) Filed: Jul. 30, 2010

(65) Prior Publication Data

US 2011/0187154 A1   Aug. 4, 2011

(30) Foreign Application Priority Data

Jul. 31, 2009 (DE) .................. 10 2009 026 297

(51) Int. Cl.
 *B62D 25/14* (2006.01)
(52) U.S. Cl.
 CPC .................. *B62D 25/145* (2013.01)
(58) Field of Classification Search
 USPC ....... 248/218.4, 219.1, 219.2, 219.4; 296/70, 296/72, 193.02, 193.06
 See application file for complete search history.

(56) References Cited

U.S. PATENT DOCUMENTS

| | | | | |
|---|---|---|---|---|
| 5,238,286 A | * | 8/1993 | Tanaka et al. | 296/70 |
| 5,277,391 A | * | 1/1994 | Haug et al. | 248/219.3 |
| 5,282,637 A | * | 2/1994 | McCreadie | 296/203.02 |
| 5,324,203 A | * | 6/1994 | Sano et al. | 439/34 |
| 5,452,871 A | * | 9/1995 | Sauber | 248/74.1 |
| 5,549,344 A | * | 8/1996 | Nishijima et al. | 296/70 |
| 5,868,426 A | * | 2/1999 | Edwards et al. | 280/779 |
| 5,931,520 A | * | 8/1999 | Seksaria et al. | 296/70 |
| 5,934,733 A | * | 8/1999 | Manwaring | 296/72 |
| 6,250,678 B1 | * | 6/2001 | Yoshinaka et al. | 280/752 |
| 6,296,303 B1 | * | 10/2001 | Kamiya et al. | 296/70 |
| 6,325,440 B1 | * | 12/2001 | Emmerich | 296/70 |
| 6,328,367 B1 | * | 12/2001 | Eichhorn et al. | 296/70 |
| 6,382,695 B1 | * | 5/2002 | Decome | 296/70 |
| 6,391,470 B1 | * | 5/2002 | Schmieder et al. | 428/598 |

(Continued)

FOREIGN PATENT DOCUMENTS

| | | |
|---|---|---|
| DE | 19513510 C1 | 3/1996 |
| DE | 198 45 146 | 4/2000 |

(Continued)

*Primary Examiner* — D Glenn Dayoan
*Assistant Examiner* — Paul Chevenert
(74) *Attorney, Agent, or Firm* — Reinhart Boerner Van Deuren P.C.

(57) ABSTRACT

A cockpit cross beam for a motor vehicle includes at least one structured metal section arranged on the driver's side, wherein the metal section exhibits cross-sectional areas varying in the axial direction and has connection elements for connecting the metal section to other structural parts of a motor vehicle body. A cockpit cross beam that permits variable steering column angles of inclination with identical steering column connection is achieved in that the metal section arranged on the driver's side in each case has rotationally symmetric cross-sectional areas as connection elements at its ends and the cross-sectional areas of the ends have a common rotational axis.

20 Claims, 5 Drawing Sheets

(56) References Cited

U.S. PATENT DOCUMENTS

| | | | |
|---|---|---|---|
| 6,422,633 B2* | 7/2002 | Neuss et al. | 296/70 |
| 6,517,139 B2* | 2/2003 | Sutou et al. | 296/70 |
| 6,523,878 B2* | 2/2003 | Scheidel | 296/70 |
| 6,644,690 B2* | 11/2003 | Brownlee et al. | 280/779 |
| 6,851,742 B1* | 2/2005 | Kubiak | 296/193.02 |
| 6,921,127 B2* | 7/2005 | Feith et al. | 296/193.02 |
| 6,921,128 B2* | 7/2005 | Davis et al. | 296/193.02 |
| 6,941,786 B1* | 9/2005 | Cooper et al. | 72/58 |
| 6,988,764 B2* | 1/2006 | Matsutani | 296/193.02 |
| 7,128,360 B2* | 10/2006 | Scheib et al. | 296/70 |
| 7,204,515 B2* | 4/2007 | Penner et al. | 280/752 |
| 7,216,927 B2* | 5/2007 | Luo et al. | 296/193.02 |
| 7,291,785 B2* | 11/2007 | Riester et al. | 174/72 A |
| 7,484,792 B2* | 2/2009 | Penner | 296/187.05 |
| 7,735,905 B2* | 6/2010 | Mullen et al. | 296/193.02 |
| 7,784,744 B2* | 8/2010 | Becker | 248/68.1 |
| 7,810,873 B2* | 10/2010 | Hitz et al. | 296/193.02 |
| 7,810,874 B2* | 10/2010 | Vican et al. | 296/193.02 |
| 8,020,355 B2* | 9/2011 | Monteiro | 52/745.2 |
| 8,029,045 B2* | 10/2011 | Merkle et al. | 296/193.02 |
| 8,100,463 B2* | 1/2012 | Penner et al. | 296/193.02 |
| 8,141,404 B2* | 3/2012 | Newport et al. | 72/283 |
| 8,141,903 B2* | 3/2012 | Atsumi et al. | 280/779 |
| 8,146,986 B2* | 4/2012 | Bierkamp et al. | 296/193.02 |
| 8,220,857 B2* | 7/2012 | Baudart et al. | 296/72 |
| 8,256,830 B2* | 9/2012 | Hitz et al. | 296/193.02 |
| 8,272,675 B2* | 9/2012 | Fowler et al. | 296/70 |
| 8,312,629 B2* | 11/2012 | Hitz et al. | 29/897.2 |
| 2005/0110302 A1* | 5/2005 | Riha et al. | 296/193.02 |
| 2006/0017309 A1* | 1/2006 | Wolf | 296/193.02 |
| 2008/0048470 A1* | 2/2008 | Vican | 296/193.02 |
| 2008/0054681 A1* | 3/2008 | Ellison et al. | 296/193.02 |
| 2010/0171339 A1* | 7/2010 | Zornack et al. | 296/193.02 |
| 2010/0215355 A1* | 8/2010 | Olien | 396/428 |
| 2010/0259064 A1* | 10/2010 | Baudart et al. | 296/72 |
| 2011/0215614 A1* | 9/2011 | Mani | 296/193.02 |
| 2011/0221224 A1* | 9/2011 | Fowler | 296/70 |
| 2011/0227369 A1* | 9/2011 | Abe et al. | 296/193.02 |
| 2011/0233964 A1* | 9/2011 | Matsutani et al. | 296/193.02 |
| 2011/0254316 A1* | 10/2011 | Watanabe | 296/193.02 |
| 2012/0038181 A1* | 2/2012 | Yamazaki | 296/72 |
| 2012/0139283 A1* | 6/2012 | Ono et al. | 296/70 |
| 2014/0252793 A1* | 9/2014 | Arzoumanian | B62D 25/145 296/72 |
| 2016/0200366 A1* | 7/2016 | Sanjo | B62D 25/145 296/70 |

FOREIGN PATENT DOCUMENTS

| | | | |
|---|---|---|---|
| DE | 10200890 A1 | 7/2003 | |
| DE | 69917091 T2 | 9/2004 | |
| JP | 5238421 A | 9/1993 | |
| JP | 05330452 A * | 12/1993 | B62D 25/04 |
| JP | 05330454 A * | 12/1993 | B62D 25/08 |

* cited by examiner

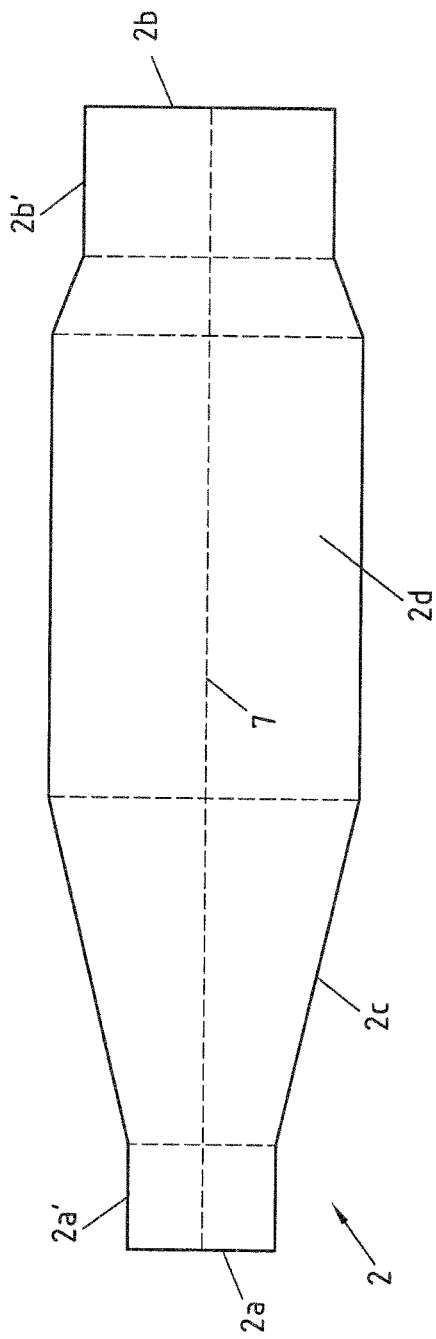
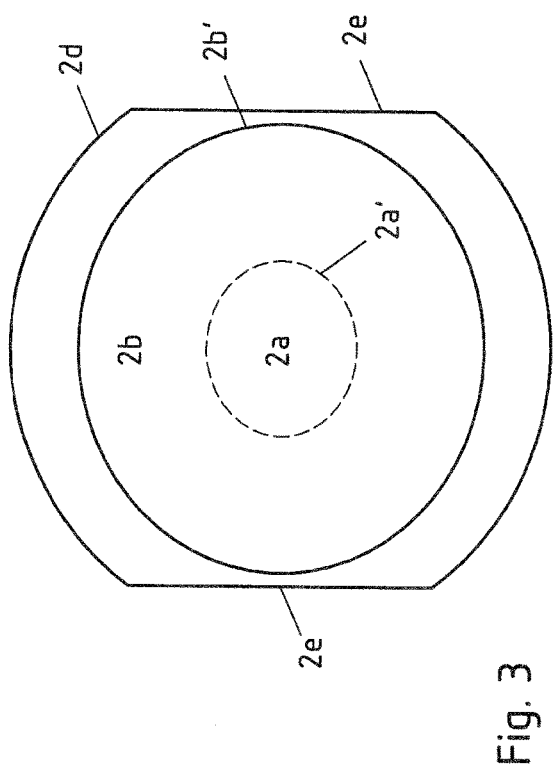
Fig. 2
Fig. 3

COCKPIT CROSS BEAM WITH VARIABLE STEERING COLUMN ANGLE OF INCLINATION

CROSS-REFERENCE TO RELATED APPLICATIONS

This application claims the benefit of and priority to German patent application No. DE 10 2009 026 297.0-21, filed on Jul. 31, 2009, the disclosure of which is incorporated herein by reference in its entirety.

FIELD OF THE INVENTION

The invention relates to a cockpit cross beam for a motor vehicle, which has at least one structured metal section arranged on the driver's side, wherein the metal section exhibits cross-sectional areas varying in the axial direction and has connection elements for connecting the metal section to other structural parts of a motor vehicle body. In addition the invention relates to a cockpit structure with a cockpit cross beam according to the invention.

BACKGROUND OF THE INVENTION

Cockpit cross beams for motor vehicles which consist of a plurality of hollow sections are known from the prior art, wherein a larger-dimensioned hollow section is generally provided on the driver's side, since the steering column connection is provided on the driver's side and therewith greater forces act on the cockpit cross beam in the event of an accident. A corresponding cockpit cross beam, for example, is known from the German published patent application DE 198 45 146. It consists of a metal section provided on the driver's side and a metal section arranged on the front passenger's side. This cockpit cross beam is problematic in that it can only be used for one specific motor vehicle type. This relates in particular to the design of the cockpit cross beam within the region of the steering column connection, since each motor vehicle type has different angles of inclination for the steering columns. The angle of inclination of the steering column to the horizontal can vary between 10 and 50° depending on motor vehicle type. The cockpit cross beam therefore on the driver's side is specifically designed to provide the steering column angle of inclination. Each motor vehicle type therefore needs its specific cockpit cross beam and corresponding tools for its production. This also applies to the steering column connections specifically designed for each motor vehicle type. A use of cross beams, steering column connections and their tools for the production of these components, which goes beyond one motor vehicle type, is currently not possible.

SUMMARY OF THE INVENTION

In one aspect, the invention included a cockpit cross beam which permits variable steering column angles of inclination with identical steering column connection.

This aspect can be achieved for a cockpit cross beam in that the metal section arranged on the driver's side in each case has rotationally symmetric cross-sectional areas as connection elements at its ends and the cross-sectional areas of the ends have a common rotational axis.

The rotationally symmetric cross-sectional areas of the ends of the metal section lying on a common axis make it possible for the metal section arranged on the driver's side to be installed in different positions, in each case turned about the rotational axis of the metal section, so that variable steering column connection angles to the horizontal are permitted with just one metal section arranged on the driver's side. Due to the rotationally symmetric structure, changes to the vehicle body or other structural parts, for example a vertical strut of the cockpit cross beam, are not required to obtain the variable angular positions. This substantially reduces the cost of producing the cockpit cross beam and the steering column connection, since these can now be used on a plurality of motor vehicle types. Polygonal surfaces, which allow a rotation of the metal section around fixed defined angles, are also conceivable for example as rotationally symmetric cross-sectional areas. A particularly simple design of the cockpit cross beam according to the invention, but also one that can be particularly finely adjusted in its arrangement, is obtained in that the metal section arranged on the driver's side in each case has circular cross-sectional areas as connection elements at its ends and the cross-sectional areas of the ends being arranged concentrically to each other. The circular cross-sectional areas, while simultaneously providing a connection to other structural components of a motor vehicle, for example an A-column, or a vertical strut of the cockpit cross beam, enable the metal section arranged on the driver's side to be installed or, respectively, aligned in any random angular position relative to a turn about its rotational axis. If the circular cross-sectional areas are used, specific angular positions relative to a turn about the rotational axis of the metal section therefore do not need to be defined. Any arbitrary angles can be set.

In accordance with a further embodiment of the cockpit cross beam according to the invention, the rotationally symmetric cross-sectional areas are provided at the ends of the metal section by axially extending connection regions. As a result it is possible that the metal section can have specifically designed cross-sectional areas at its ends, wherein the shape transition from the region of the metal section on the driver's side, which serves to hold the steering column connection for example, up to the connection element can be produced without abrupt forming processes. This not only simplifies the production of the metal section but also improves its strength.

If the connection regions of the metal section have constant cross-sectional areas in the axial direction at its respective ends, it is possible in accordance with a further embodiment of the cockpit beam according to the invention to use just one tool set for the production of metal sections arranged on the driver's side with variable lengths. As a result of the cross-sectional areas within the connection regions, which are constant in the axial direction, the possibility of using plates cut to varying lengths in a tool set for the production of the metal section is thereby opened up. This further reduces the cost of producing the cockpit cross beam.

Preferably the metal section is a closed, structured hollow section and can therefore provide maximum rigidity at minimal weight.

In accordance with another embodiment of the cockpit cross beam according to the invention, the metal section has a region with a cross-section running conically in the axial direction, so that the provision of a larger cross-sectional area, for example for the region of the steering column connection of the metal section, can be more simply produced. In addition, a greater rigidity of the metal section arises as a result of the region with conically running cross-section.

If the metal section has coplanar lateral surfaces at least within the region of the steering column connection, a steering column connection to the metal section arranged on the driver's side can be simply obtained. Furthermore, alignment of the metal section in relation to the provision of the steering column connection angle is simplified.

Finally, the cockpit cross beam according to the invention is further improved in that the metal section arranged on the driver's side has a connection region for struts, in which the upper and/or lower side of the metal section has an at least partially circular contour. The circular contour within the connection region of the metal section ensures that when the metal section is turned about its rotational axis in order to provide another steering column angle of inclination, an adequate connection area, for example for welding a provided strut to the metal section, is still maintained irrespective of its position.

In accordance with a second teaching of the present invention, the object indicated above is achieved by a cockpit structure comprising a cockpit cross beam according to the invention. The cockpit structure, in using the cockpit cross beam according to the invention, can provide steering column angles of inclination with an angular range of +/−20° without the metal section of the cockpit cross beam having to be exchanged. The number of components needed for the production of cockpit structures with variable steering column angles of inclination is therefore substantially reduced. This also applies to a further embodiment of the cockpit structure according to the invention. In this cockpit structure at least one vertical strut is provided, which connects the metal section arranged on the driver's side to the base region or tunnel region and/or cowl of a vehicle body and has a rotationally symmetric seat to hold one end of the metal section. The rotationally symmetric seat permits the metal section arranged on the driver's side to be aligned in various angular positions relative to the rotational axis of the metal section. Preferably the seat is circular in order to allow any arbitrary angular positions. Also the vertical strut can then be used as a common part for various motor vehicle types. Furthermore, it improves the rigidity of the cockpit structure.

If a first strut consisting of a metal section is provided for connecting the metal section of the cockpit cross beam to the bulkhead or the cowl of a vehicle body, wherein the first strut has a connection region for connecting the first strut to the metal section, additional stiffening of the cockpit structure can be achieved.

A variable connection of the first strut to the metal section arranged on the driver's side is obtained in accordance with a further embodiment of the cockpit structure according to the invention in that the metal section, at least within the connection region of the first strut, has an at least partially circular contour perpendicular to the axial direction of the metal section and the connection region of the first strut is adapted to this circular contour. The circular contour of the metal section enables the metal section to turn about the axial direction or its rotational axis, respectively, the connection regions between first strut and the metal section arranged on the driver's side being consistently provided despite the turn, without the design of the first strut having to be changed. Neither the metal section arranged on the driver's side nor this first strut have to be adapted in the case of the cockpit structure according to the invention in order to provide variable steering column angles of inclination.

A very simple way to connect the steering column to the cockpit cross beam according to the invention is achieved by providing a steering column console, which is fastened via securing means, preferably bolts with bushings, running perpendicularly to the axial direction of the metal section to the metal section arranged on the driver's side.

In accordance with an alternative embodiment of the cockpit structure, a modular seating plate is provided, which serves to hold a steering column console, and the modular seating plate is welded to the metal section arranged on the driver's side.

Both alternatives permit variable steering column angles of inclination to be provided when the metal section arranged on the driver's side is turned about its rotational axis.

If a second strut is provided for connecting the metal section arranged on the driver's side to the cowl or the bulkhead of a motor vehicle, additional stiffening of the cockpit structure can be achieved in accordance with a further embodiment of the cockpit structure according to the invention.

In order to reduce the cost of the first and the second strut as far as possible, the first and the second strut can be connected to the bulkhead or the cowl at a common connection point in accordance with a further embodiment of the cockpit structure according to the invention.

BRIEF DESCRIPTION OF THE DRAWINGS

The invention is described below in further detail on the basis of exemplary embodiments in conjunction with the drawing.

FIG. 2 shows in an axial sectional view, the metal section on the driver's side from the exemplary embodiment of FIG. 1, FIG. 3 shows a schematic top view in the axial direction onto the metal section arranged on the driver's side of the exemplary embodiment of FIG. 2.

DESCRIPTION OF THE INVENTION

Figure 1:
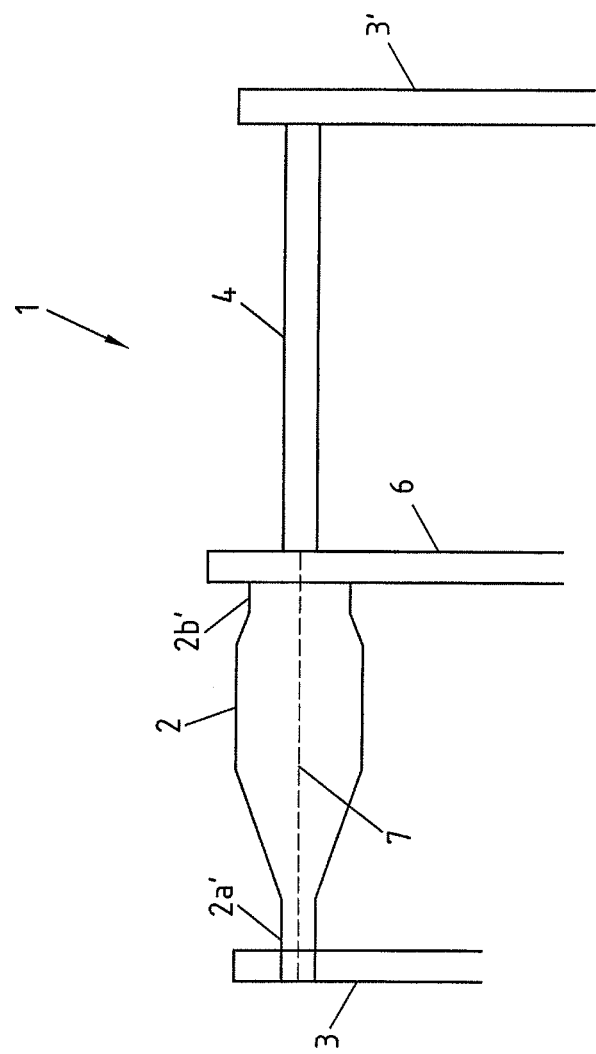
FIG. 1 shows a schematic sectional view of a cockpit cross beam according to the invention in accordance with a first exemplary embodiment.

Firstly, FIG. 1 illustrates a first exemplary embodiment of a cockpit cross beam 1 according to the invention, which has a metal section 2 arranged on the driver's side, which metal section 2 is structured, that is to say the metal section has a cross-sectional contour adapted to the application. Also visible in FIG. 1 are the two A-columns 3 and 3' and a cross beam 4, which is provided on the front passenger's side.

Furthermore, a vertical strut 6 is schematically illustrated, which connects the cockpit cross beam 1 to a tunnel region or the base region of the body of the vehicle (not shown here). The metal section provided on the driver's side at its ends has connection regions 2a', 2b' with in each case rotationally symmetric connection elements, present circular in shape, which possess a common rotational axis 7. As a result, it is possible to turn the metal section 2 arranged on the driver's side about an angle of rotation around the rotational axis 7 or to install this in the turned state, respectively.

FIG. 2 shows the metal section 2 arranged on the driver's side in an enlarged view. The metal section 2 has a region 2c, which exhibits a conical cross-sectional contour. The region for the steering column connection of the metal section 2d has a larger cross-section, for example, than the connection regions 2a' within the region of the A-column or 2b' within the region of the vertical strut 6, respectively. This is necessary in order to absorb, at this point, the increased forces which are exerted from the steering column onto the cockpit cross beam 1. The cross-sectional areas 2a, 2b of the connection regions 2a', 2b' are present circular in shape.

FIG. 3 shows the metal section arranged on the driver's side in a schematic, axial top view. It can clearly be seen that the connection regions 2a', 2b' of the metal section, the design of which is circular in this exemplary embodiment, and their cross-sectional areas 2a, 2b are arranged concentrically to each other. This also enables the metal section to turn about its rotational axis so that variable steering column angles of inclination can be provided.

Figure 4A:
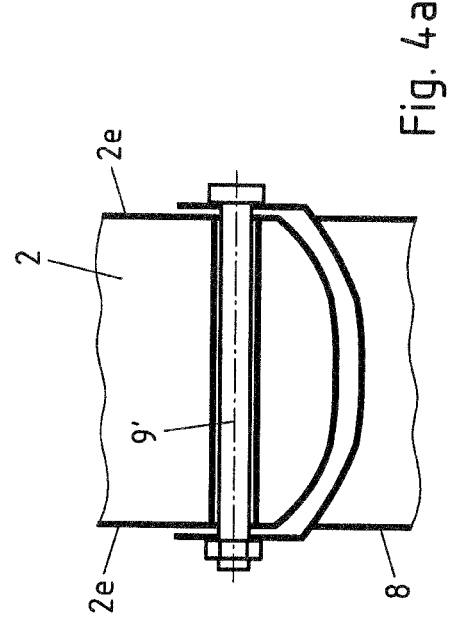
FIG. 4 shows a schematic sectional view of the metal section arranged on the driver's side of an exemplary embodiment of the cockpit cross beam according to the invention with steering column and its connection.
Figure 4:
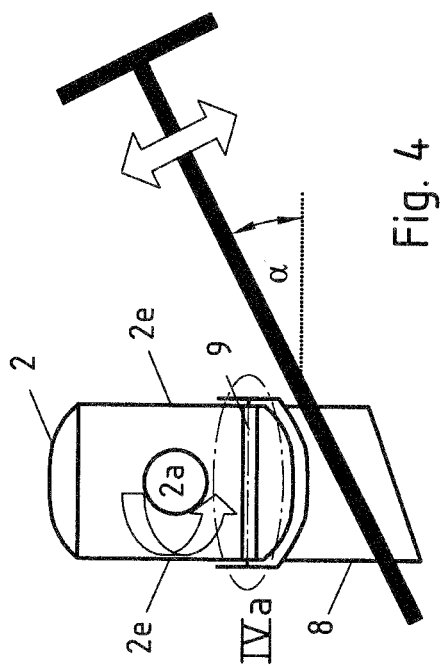
Figure 5:
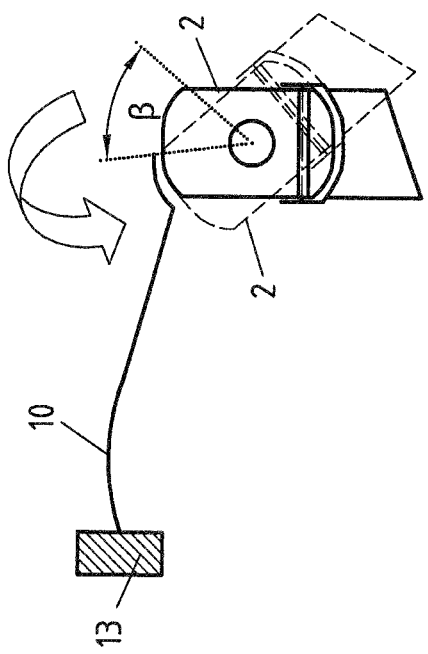
FIG. 5 shows a schematic sectional view of a further exemplary embodiment of the cockpit cross beam with a strut to the cowl.

FIG. 4 illustrates a further exemplary embodiment of the cockpit cross beam 1 according to the invention in a sectional view within the region of the metal section 2. The metal section 2 of FIG. 4 has circular cross-sectional areas 2a, 2b, identical in each case, as connection elements, the connection element 2b not being illustrated. It can clearly be seen that, as in FIG. 3, the metal section 2 has coplanar lateral surfaces 2e within the region of the steering column connection. As a result of the coplanar lateral surfaces 2e, the connection of a steering column is rendered particularly simple. This is shown by the steering column console 8, which is schematically illustrated here and is only connected to the metal section 2 via securing means 9 running perpendicularly to the axial direction. As already illustrated in FIG. 4, the steering column angle of inclination a can be changed by turning the metal section 2 inside the cockpit cross beam.

FIG. 4a shows details of an identical embodiment of the cockpit cross beam as FIG. 4, which comprises bolts with bushings as securing means 9' running perpendicularly to the axial direction of the cross beam.

As already illustrated by FIGS. 3 and 4, the metal section 2 not only has coplanar lateral surfaces 2e within the region of the steering column connection 2d, but also an at least partially configured circular contour on the upper and lower side. The circular contour within the region 2d of the metal section allows just one strut 10 to be used, which connects the metal section 2 to the cowl, even if the metal section 2 has been turned about its rotational axis, for example about the angle β, which may amount to a maximum of approximately 40°.

Figure 6:
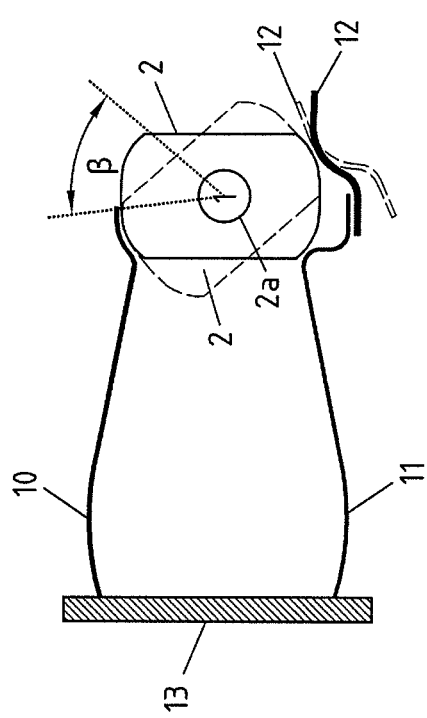
FIG. 6 shows the cockpit cross beam of FIG. 5 in a schematic sectional view comprising two struts to the cowl and a modular seating plate.
Figure 7:
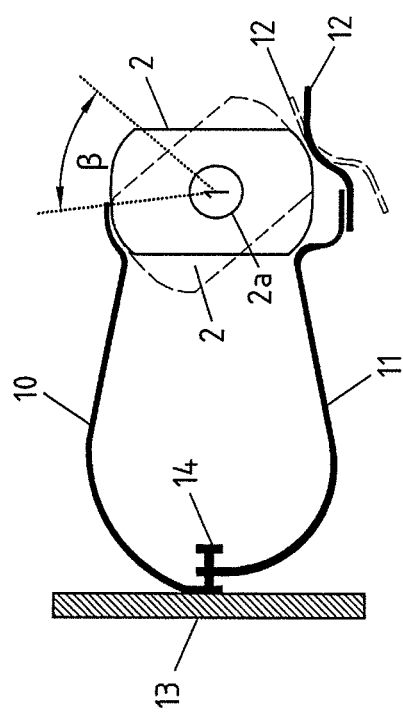
FIG. 7 shows an exemplary embodiment of a cockpit cross beam according to the invention of FIG. 6 with an alternative connection to the cowl or the bulkhead, respectively.

FIGS. 6 and 7 now show a further exemplary embodiment of the cockpit cross beam according to the invention in a sectional view within the region of the steering column connection. The metal section 2 and the circular connection region 2a as well as a modular seating plate 12 welded to the metal section, which modular seating plate 12 serves to hold a steering column console (not illustrated), can again be seen. The metal section 2 is connected by a first strut 10 and a second strut 11 to the cowl 13. Preferably the first and second strut 10, 11 each use a connection point 14 for connecting the metal section 2 to the cowl or to the bulkhead 13, respectively. This variant is shown in FIG. 7.

As can be seen in FIGS. 6 and 7, when the metal section 2 is turned in order to attain another steering column angle of inclination, only an additional and changed second strut 11 is needed to connect the cockpit cross beam to the bulkhead or the cowl 13, respectively.

Figure 8:
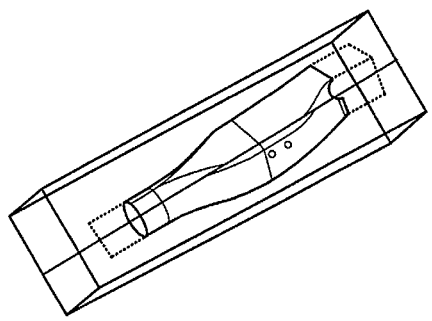
FIG. 8 shows a schematically illustrated tool for the production of the metal section of the cockpit cross beam according to the invention.
Figure 9:
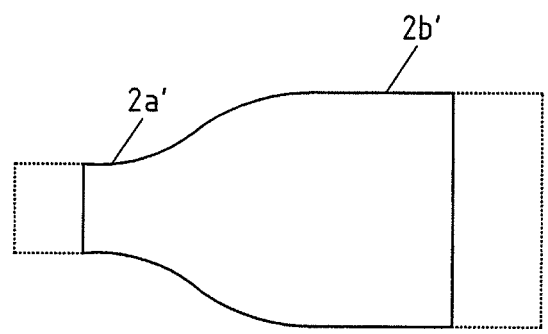
FIG. 9 shows in a schematic top view, various sheet metal blanks for the production of the metal section on the driver's side.

FIGS. 1 and 2 have already shown that the rotationally symmetric cross-sectional areas of the connection elements are provided at the ends of the metal section 2 through regions 2a' and 2b' with constant cross-section. This opens up the possibility of using an identical tool and in each case adjusting the length of the metal section 2 only via the cut-out blank. FIG. 8 shows this very schematically in a perspective view and FIG. 9 shows the metal blank. The arrangement of the connection region 2a' and 2b' with constant cross-sectional areas therefore permits a simple use of the metal section 2, which goes beyond one motor vehicle type, for example in automotive production series, which have a different width of the passenger area. Thus the parts required for various motor vehicle types, for example small to luxury passenger cars, can be reduced. FIGS. 8 and 9, in the areas marked by broken lines, each illustrate the longer version of the hollow section to be produced.

The invention claimed is:

1. A cockpit cross beam for a motor vehicle, the cockpit cross beam comprising:
    a one-piece structured metal section;
    wherein the metal section exhibits cross-sectional areas varying in the axial direction;
    wherein the metal section has connection elements for connecting the metal section to other structural parts of a motor vehicle body;
    wherein the metal section only extends within the region of the driver's side of the cockpit beam;
    wherein the metal section has rotationally symmetric cross-sectional areas as connection elements at the ends;
    wherein the cross-sectional areas of the ends have a common rotational axis and at least partially a circular contour; and
    wherein the metal section has planar parallel lateral surfaces at least within the region of a steering column connection.

2. The cockpit cross beam of claim 1, wherein the metal section is a closed, structured hollow section.

3. The cockpit cross beam of claim 1, wherein the metal section has a cross-section running conically in the axial direction.

4. The cockpit cross beam of claim 1, wherein the metal section has a connection region for struts, in which the upper or lower side of the metal section has an at least partially circular contour.

5. The cockpit cross beam of claim 1, wherein the metal section has a connection region for struts, in which the upper and lower side of the metal section has an at least partially circular contour.

6. The cockpit cross beam of claim 1, wherein the structured metal section that extends only within the region of the driver's side of the cockpit beam has first and second conical sections, the structured metal section being positioned between the first and second conical sections, the first conical section increases in diameter when moving in a first direction towards the second conical section and the second conical section increasing in diameter when moving in a second direction, opposite the first direction, towards the first conical section.

7. The cockpit cross beam of claim 1, wherein the structured metal section has generally hollow shape and the coplanar lateral surfaces are directly provided by the sidewall portions providing the hollow shape of the structured metal section, the connection elements having a different cross-sectional shape than the portion of the structured metal section that provides the coplanar lateral surfaces.

8. The cockpit cross beam of claim 7, wherein the connection elements and the lateral surfaces are formed from a single cut-out blank to form the one-piece structured metal section.

9. The cockpit cross beam of claim 1, wherein the metal section in each case has circular cross-sectional areas as connection elements at the ends and the cross sectional areas of the ends are arranged concentrically to each other.

10. The cockpit cross beam of claim 9, wherein the circular cross-sectional areas are provided at the ends of the metal section by axially extending connection regions.

11. The cockpit cross beam of claim 10, wherein the connection regions of the metal section have constant cross-sectional areas in the axial direction at the respective ends.

12. A cockpit structure comprising the cockpit cross beam of claim 1.

13. The cockpit structure of claim 12, further comprising a vertical strut which connects the metal section to the base region or tunnel region or cowl of a body and has a rotationally symmetric seat to hold one end of the metal section.

14. The cockpit structure of claim 12, further comprising a steering column console, which is fastened via securing means running perpendicularly to the axial direction of the metal section.

15. The cockpit structure of claim 12, further comprising a modular seating plate, which serves to hold a steering column console, and the modular seating plate is welded to the metal section.

16. The cockpit structure of claim 12, further comprising a steering column console, which is fastened via bolts with bushings running perpendicularly to the axial direction of the metal section.

17. The cockpit structure of claim 12, further comprising a first strut, including a metal section for connecting the metal section of the cockpit cross beam to the bulkhead or the cowl of a vehicle body, wherein the first strut has a connection region for connecting the first strut to the metal section.

18. The cockpit structure of claim 17, wherein the metal section, at least within the connection region of the first strut, has an at least partially circular contour perpendicular to the axial direction of the metal section and the connection region of the first strut is adapted to this circular contour.

19. The cockpit structure of claim 12, further comprising a second strut for connecting the metal section to the cowl or the bulkhead.

20. The cockpit structure of claim 19, wherein the first and the second struts are connected to the bulkhead or the cowl at a common connection point.

* * * * *